United States Patent Office 3,032,155
Patented May 1, 1962

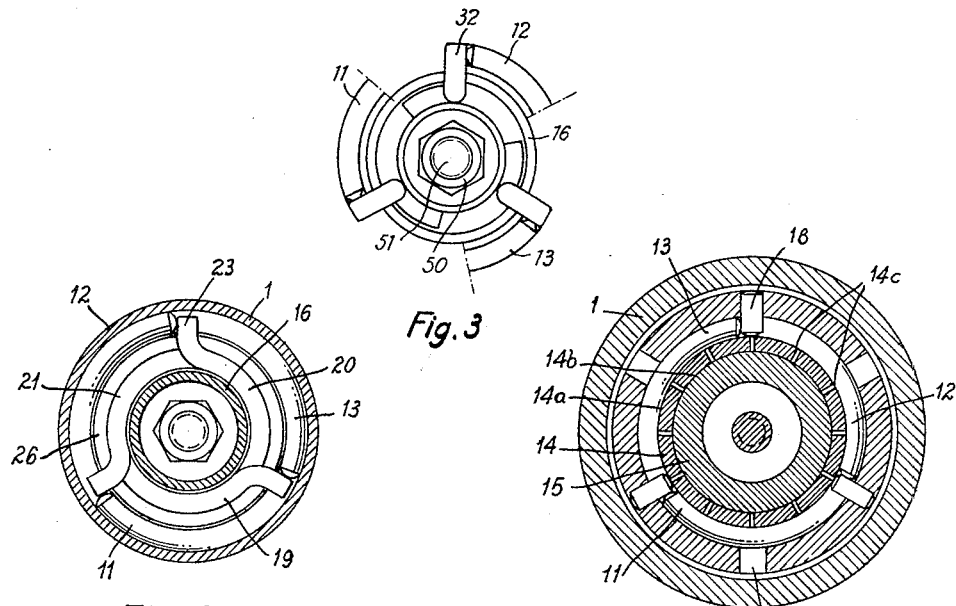
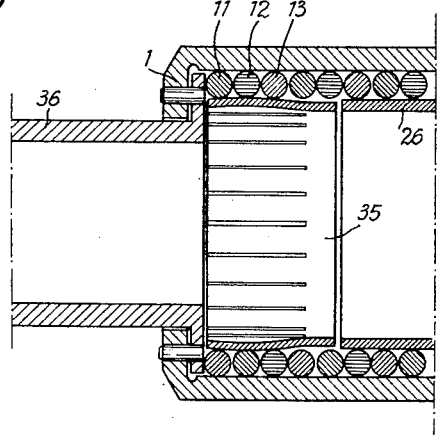
Fig. 3
Fig. 5
Fig. 6
Fig. 4

3,032,155
FREE-WHEEL MECHANISMS
Jean H. Bertin, Neuilly-sur-Seine, and Benjamin J. M. Salmon, Suresnes, France, assignors to Societe Bertin & Cie, Paris, France, a French company
Filed Jan. 19, 1959, Ser. No. 787,527
Claims priority, application France Jan. 22, 1958
8 Claims. (Cl. 192—41)

The present invention relates to improvements in free wheel mechanism claimed in our co-pending application No. 715,433 filed February 14, 1958, now abandoned.

The free wheel mechanism of this prior application comprises a selector element in the form of a helical spring which is arranged to transmit torque between a driving shaft and a driven shaft in only one direction, one of the ends of the spring being connected to one of the shafts and the other end of the spring acting as detection means for tightening the coils of the spring against a cylindrical wall of a coupling member drivably associated with the other of said shafts upon angular movement of the driving shaft relative to the driven shaft in said one direction.

The present invention provides important improvements in the free wheel mechanism referred to above, particularly as regards the fixing of the spring to the driving shaft, the system of detection for spacing or unwinding of the relay spring, the use of an oil circulation and a floating support in the form of a supporting ring or hub limiting the contraction of the spring when it is inoperative.

Embodiments of the invention will now be described by way of example with reference to the accompanying drawings, in which FIG. 1 is a longitudinal section showing one preferred embodiment applicable to the transmission of an alternating angular movement to a driven shaft in the form of a series of angular displacements in a constant direction;

FIG. 3 is a fragmentary end view of the detection means of the arrangement of FIG. 2;

FIG. 4 shows a resilient split ring device acting as detector.

FIG. 5 is a fragmentary end view taken along the line V—V of FIG. 1, and

FIG. 6 is a fragmentary end view taken along the line VI—VI of FIG. 1.

Figure 1:
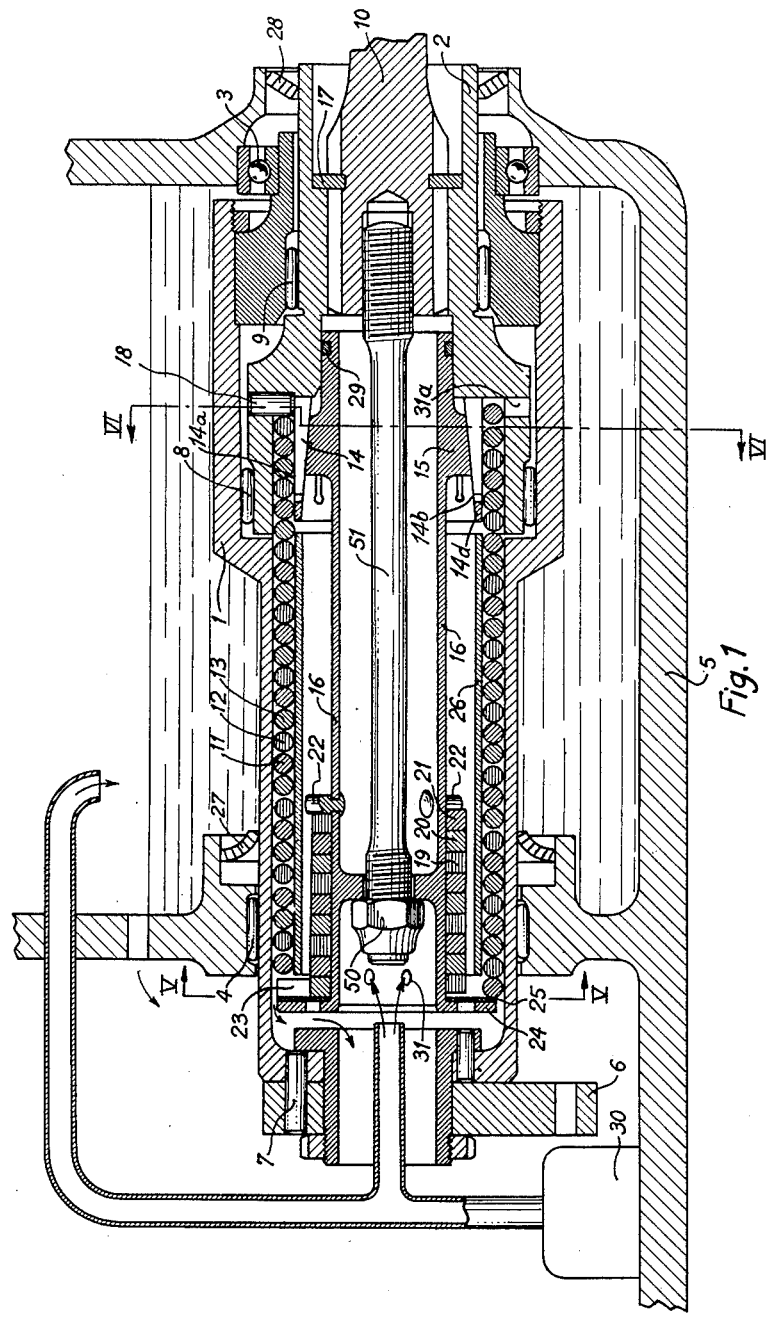

In FIG. 1, a driving part 1 of the free-wheel device revolves in roller bearings 3 and 4 in a casing 5, the part 1 being itself driven in this example through a crank 6 by means of a driving dog 7. A driven part 2 is rotatably mounted in roller bearings 8 and 9 in the part 1 and drives a shaft 10, which can for example be a torsion rod, by means of splines. Three helical relay springs 11, 12 and 13 (which are indicated in the drawing by different cross-hatching) are mounted within the part 1, the coils of these springs being intercalated and the ends of the springs being offset by 120° (as shown in FIG. 3). These springs are fixed to the driven part 2 by the locking action of an expandable sleeve 14. The expandable sleeve comprises a cylindrical outer part 14a, engaged by the internal portion of those coils of the clutch springs 11, 12, 13 which are located towards the driven member 2. The sleeve also comprises an internal conical part 14b. To make it expandable, the sleeve is provided with longitudinal slots 14c (FIG. 6) substantially along its entire length. The slots 14c confine conical sectors joined together only by the part of the sleeve where the internal conical part 14b has a greater diameter, vis. 14d. The conical sectors engage, by their internal conical parts 14b, a cone 15 which is carried by a tube 16 fixed to the shaft 10 by means of a locking nut 50 and a pin 51. The tightening of the nut has a double action: expansion of the cone 14 and the retention of the shaft 10, a groove of which contains a stop ring 17.

The springs 11, 12 and 13 are also secured against any danger of sliding in the operative direction by studs 18, which form an abutment at the end of each of these springs.

The other end of each of the springs is free and slides with slight friction in the inoperative direction against the bore of the part 1. The friction, which is in the operative direction, ensures the detection and jamming of the springs against the bore of the part 1 is caused and regulated by three spiral springs 19, 20 and 21, intercalated like the springs 11, 12, 13. The springs 19, 20, 21 bear at one end against abutments 22 fixed at 120° spacings on the tube 16, and tangentially push back each of the relay springs 11, 12, and 13 by means of their other ends, which are bent over for this purpose, as indicated at 23. This tangential force and thus the intensity of the detection is adjusted on assembly at the time of locking the fixing nut of the tube 16 by angular adjustment of the driven part 2 relative to the tube 16. The most favorable position is determined by calculation or experience. In the case of mass production, it can be determined in advance by reference marks or abutments on each of the two components.

The ends 23 of the springs 19, 20, 21 are guided by a friction washer 25 supported by a shoulder 24 on the tube 16.

The relay springs 11, 12, and 13 are supported internally by a hub 26 formed as a simple floating tube. The clearance between the hub 26 and the bore of the part 1 limits the amplitude of the relative movements of the relay springs, and the selection of a suitable size of hub 26 to provide a clearance of minimum value makes it possible to obtain very high alternating rates of operation. The floating assembly of the springs 11, 12, 13 and the hub 26 reduces unnecessary friction and permits a simpler construction.

The free wheel device preferably works in an oil bath contained in the casing 5, and fluid-tight joints 27, 28 and 29 prevent oil losses. The oil is circulated by means of a pump 30 which also directly feeds oil to the detection springs and the washer 25 through aperatures such as 31 formed in the tube 16, and then to the roller bearings 8 and 9 through apertures formed in the part 2, these apertures being such as those indicated at 31a. The pump is fed by the return of the oil as indicated by the arrows. A joint 40 of known type and indicated in broken lines in FIG. 2 can be disposed in the crank pin carrying the crank 6 to produce a forced circulation. In this case, the return of the oil in the casing is for example effected through the roller bearings 8, 9 and 3.

Figure 2:
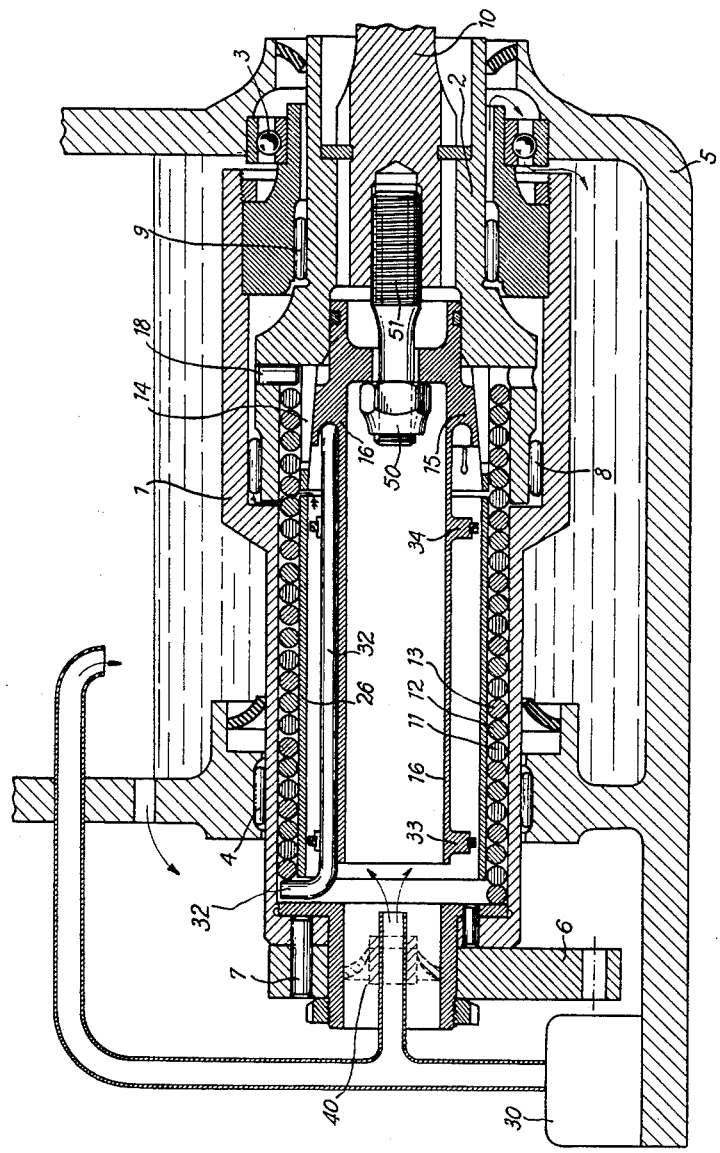
FIG. 2 shows a modified form of this embodiment in which the elastic detection means for spacing or separation of the relay spring are torsion rods.

FIGS. 2 and 3 show a similar assembly to that of FIG. 1 in which the detection is by tangential action on the relay springs, but in FIGS. 2 and 3 the detection is assured by three rods 32, which form torsion rods or bars and are curved over at their ends. FIG. 3 is an end view of these three rods, bearing against a groove in the tube 16, this groove ensuring the reaction of the tangential actions of the other ends. In addition, the rods are held by bearings milled in shoulders 33 and 34 on the tube 16 (not shown in FIG. 3) and held by retaining rings on these shoulders.

Instead of the detection being assured by springs having a tangential action on the free ends of the relay springs as in the arrangements of FIGS. 1–3, it can be due simply to a reinforced friction of the said ends against the bore of the part 1, this effect being obtained either as illustrated in FIGS. 8, 9 and 10 of the specification of the above mentioned prior application, or by machining a taper with a very small slope inside the bore of the part 1 so as to obtain a locking action when mounting the relay springs in the latter.

The detection can also be obtained by expansion springs, one example of which is illustrated in FIG. 11 of the above mentioned specification.

These expansion springs can also take the form shown in FIG. 4, which represents an assembly similar to that of FIG. 1, but in which a ring 35, slotted outwardly along parts of the convex generatices forms a spring, which when introduced as a force-fit inside the relay springs, causes the desired friction of the latter in the bore of the driving part 1. The spring ring 35 is held between a hardened steel friction element 36 and the hub 26 which is mounted freely as in the arrangements of FIGS. 1–3.

In effect, the tightening of the nut 50, screwed on the pin 51, causes a traction effect on this pin. This traction effect is transmitted to the driven shaft 10 which carries the pin. The stop ring 17 housed in a groove of the shaft bears against a second shoulder of the driven member 2, the first shoulder of the member urging the conical sectors of the sleeve 14 against the cone 15.

It follows that a radical expansion of the conical sectors, which bear against the internal parts of the coils of the clutch springs 11, 12 and 13, causes the diameter of these coils to increase and the latter become jammed against the bore or seating means of the driven member 2. The radial stresses involved are considerable due to the comparatively low slope of the conical pieces 14 and 15.

When the blocking of the nut 50 is effected, the members 51, 16, 10, 17, 14, 2, and the related coils of the clutch springs 11, 12 and 13 are thus jammed together and form a whole assembly which is rigid.

Moreover, the orientation about its axis, during the blocking of the tube 16, allows a regulation of the thrust exerted by the energizing springs 19, 20 and 21 (FIG. 1) or 32 (FIG. 2) on the free ends of the clutch springs 13, 12 and 11, respectively (FIGS. 5 and 3). It has been found that this thrust is transmitted only to the coils which are the nearest to the free ends of the springs, these latter coils being expanded in diameter and bear with a slight friction against the bore or seating means of the member 1. All the remaining coils are tightened against the floating hub 26, during the phase of the movement when the clutch springs do not transmit any torque.

In the embodiments of FIGS. 1 and 5, the bent ends 23 of the energizing springs 19, 20 and 21 act by tangential thrust on the clutch springs 11, 12 and 13.

If one considers now one complete cycle of operation in the case of FIGS. 1, 5 and 6, assuming the assembly at rest as shown in the drawings, it is noted that there is substantially no torque transmission when the driving member rotates in clockwise direction in FIG. 5 (in counterclockwise direction in FIG. 6). In effect, the slight friction of the coils of the clutch springs located in the vicinity of the free ends thereof against the seating means or bore of the member 1, causes no jamming since it tends to cause a winding of the clutch springs, accordingly, a decrease in their diameter.

On the contrary, when the driving member 1 rotates in counterclockwise direction, in FIG. 5, the slight friction of the related coils tends to unwind them. Thus their diameter increases, oil is drawn off by the pressure between the coils and the seating bore of member 1. The remaining coils of the clutch springs unwind, move off from the floating 26 and jam against the seating bore of 1. The bearing strength against the member 1, which causes a blocking effect, is proportional to $A^n$, $n$ being the number of the coils considered from the free end (on the left side in FIG. 1), and A being approximately equal to 2. This strength becomes rapidly considerable and the jamming or blocking effect is perfect. The torque is transmitted by compression on those coils of the clutch springs 11, 12 and 13 which go from the seating means of the driving member 1 to the seating means of the driven member 2. It is to be noted that the members 50, 52, 16, 17, 14 and finally 10 are blocked on mounting and form a rigid assembly with the driven member 2.

There is a slight angular delay between the time when the member 1 begins to rotate in the clutching direction and the time when the clutching effect is actually obtained. That delay is due to the unwinding of the clutch springs between their tightening at rest on the hub 26 and their active jamming against the seating means of said member 1. Thus it is beneficial to minimize the radial clearance between the clutch springs and the seating means. That is provided by the floating hub 26 which allows a considerable reduction of that clearance, e.g. 0.03 mm. at the scale of the drawings, while a strict alignment of the members 1 and 2 is not needed.

As to FIGS. 2 and 3, the operation is the same, except that the rotation direction is reversed.

Finally, without departing from the invention, all the arrangements described above can easily be modified, so that the relay springs work in tension in the operative direction on the outside of the driving shaft, as shown in FIG. 14 of the above mentioned specification.

What is claimed is:

1. A free-wheel mechanism comprising a first member and a second member relatively rotatable and coaxial therewith, said members being provided with seating means having a cylindrical wall disposed at the junction of said members, one seating means being associated with the first member and a second seating means being associated with the second member, said seating means being co-axial and of the same diameter, a radially expansible ring having a cylindrical outer surface and an inner conical surface disposed within the seating means associated with said first member, said first member carrying means providing an outer conical surface disposed to engage said inner conical surface of said ring to expand said ring radially upon axial movement of said first member, a plurality of similar clutch-springs having coils evenly intercalated one between the other and disposed within said seating means, the last coils of said clutch-springs at one end surrounding said ring and being pressed against said seating means of said first member by radial expansion of said ring, a floating tube supporting with an initial gripping action the remaining coils of said clutch-springs whereby said coils lie close to said seating means associated with said second member, and means detecting the directional sense of the relative angular speed between said first member and said second member and acting on the free ends of said clutch-springs, which slide with slight friction against the cylindrical wall of said seating means to jam said remaining coils of said clutch-springs on said seating means.

2. A free-wheel mechanism as defined in claim 1, wherein the free-wheel assembly is disposed in an oil bath, and said mechanism further comprises an oil-pump including a pipe for projecting oil under pressure substantially at the level of the free end of said clutch-springs.

3. A free-wheel mechanism as defined in claim 2, wherein said means providing said outer conical surface is a tubular element coaxial with said members forming an extension of said first member and being secured at one end to said first member by means of a nut and screw assembly, said tubular element having a greater length than said floating tube and carrying said detecting means.

4. A free-wheel mechanism as defined in claim 3, further comprising radial dogs each bearing resiliently on the free end of a different one of said clutch-springs for regulating the detecting by friction of the free ends of said clutch-springs and biasing said free ends in the direction to effect expansion of said clutch-springs.

5. A free-wheel mechanism as defined in claim 4, wherein said detecting means comprise a plurality of energizing springs wound on the free end of said tubular element, one end of said energizing springs being rotatable with said tubular element and the other end of said energizing springs forming said radial dogs bearing on the ends of said clutch-springs.

6. A free-wheel mechanism as defined in claim 4, wherein said detecting means comprise a plurality of torsion rods disposed around the axis of said tubular element and guided in parallel relationship thereto, one of the ends of said rods forming the said radial dogs and the other of the ends of said rods being fixed to said tubular element.

7. A free-wheel mechanism as defined in claim 1 further comprising a resilient expansible tubular ring disposed to ensure the expansion of the free ends of said clutch-springs, said tubular ring being formed with longitudinal slots opening from the side of said tubular ring corresponding to the ends of said clutch-springs.

8. A free-wheel mechanism as defined in claim 7, wherein said second member is formed with an end stop and said expansible tubular ring is held longitudinally between said floating tube and said end stop.

References Cited in the file of this patent
UNITED STATES PATENTS

| | | |
|---|---|---|
| 935,909 | Henrici | Oct. 5, 1909 |
| 1,966,267 | Starkey | July 10, 1934 |
| 2,459,972 | Starkey | Jan. 25, 1949 |